(12) United States Patent
Kim

(10) Patent No.: US 10,116,154 B2
(45) Date of Patent: Oct. 30, 2018

(54) BATTERY PACK

(71) Applicant: SAMSUNG SDI CO., LTD., Yongin-si, Gyeonggi-do (KR)

(72) Inventor: Taejin Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 229 days.

(21) Appl. No.: 14/730,387

(22) Filed: Jun. 4, 2015

(65) Prior Publication Data

US 2016/0164328 A1    Jun. 9, 2016

(30) Foreign Application Priority Data

Dec. 3, 2014    (KR) ........................ 10-2014-0172389

(51) Int. Cl.
*H02J 7/00*    (2006.01)

(52) U.S. Cl.
CPC .......... *H02J 7/0052* (2013.01); *H02J 7/0029* (2013.01); *H02J 2007/004* (2013.01)

(58) Field of Classification Search
CPC .................................................. H02J 7/0052
USPC ...................................................... 320/112
See application file for complete search history.

(56) References Cited

U.S. PATENT DOCUMENTS

| 5,128,654 | A  | * | 7/1992 | Griffin | .................... | G08B 13/19 |
| | | | | | | 250/342 |
| 7,298,113 | B2 | * | 11/2007 | Orikasa | ............... | H01M 6/5033 |
| | | | | | | 320/103 |
| 8,450,975 | B2 | * | 5/2013 | Kim | .................... | H01M 10/425 |
| | | | | | | 320/134 |
| 9,007,015 | B1 | * | 4/2015 | Nook | .................... | H02J 7/0054 |
| | | | | | | 307/150 |
| 9,077,196 | B2 | * | 7/2015 | Sim | ........................ | H02J 7/0063 |
| 2009/0197152 | A1 | * | 8/2009 | Johnson | .................... | B25F 5/02 |
| | | | | | | 429/61 |
| 2010/0133914 | A1 | | 6/2010 | Kang et al. | | |

(Continued)

FOREIGN PATENT DOCUMENTS

JP    2003-143769    5/2003
JP    2010-219009 A    9/2010

(Continued)

OTHER PUBLICATIONS

Korean Office Action dated Aug. 11, 2015 in Corresponding Korean Patent Application No. 10-2014-0172389.

(Continued)

*Primary Examiner* — Drew A Dunn
*Assistant Examiner* — Jerry D Robbins
(74) *Attorney, Agent, or Firm* — Lee & Morse, P.C.

(57) ABSTRACT

A battery pack includes a battery, main switch, controller, and driving voltage supply source. The battery has at least one battery cell. The main switch is connected between a first node and a second node, the battery is connected to the first node and an external terminal, and the external terminal connected to the second node. The controller manages the battery and to control the main switch. The driving voltage supply source generates a driving voltage based on a voltage of a third node and to supply the driving voltage to the controller. The third node is diode-connected to the first node and the second node.

9 Claims, 4 Drawing Sheets

(56) References Cited

U.S. PATENT DOCUMENTS

2013/0113430 A1*   5/2013   Kim ..................... H02J 7/0032
                                                                    320/134
2013/0221924 A1    8/2013   Sim et al.
2014/0203736 A1*   7/2014   Kim ..................... H02J 7/0029
                                                                    318/139

FOREIGN PATENT DOCUMENTS

| KR | 10-2010-0027084 A | 3/2010 |
| KR | 10-2010-0062258 A | 6/2010 |
| KR | 10-2010-0085791 A | 7/2010 |
| KR | 10-2010-0099421 A | 9/2010 |
| KR | 10-2013-0049880   | 5/2013 |
| KR | 10-2013-0098680 A | 9/2013 |

OTHER PUBLICATIONS

Korean Notice of Allowance dated Jan. 28, 2016 in Corresponding Korean Patent Application No. 10-2014-0172389.

* cited by examiner

BATTERY PACK

CROSS-REFERENCE TO RELATED APPLICATION

Korean Patent Application No. 10-2014-0172389, filed on Dec. 3, 2014, and entitled, "Battery Pack," is incorporated by reference herein in its entirety.

BACKGROUND

1. Field

One or more embodiments described herein relate to a battery pack.

2. Description of the Related Art

A battery pack includes a control circuit for controlling a plurality of secondary cells. The secondary cells may convert chemical energy to electrical energy, or vice versa, and may be repeatedly charged and discharged. The control circuit may be driven by an external power source connected to an external terminal of the battery pack.

When no external power source is connected to the battery pack, the control circuit may receive power from the secondary cells. When the secondary cells are in a low-voltage state, the control circuit turns on switches between the secondary cells and the external terminal in order to protect the cells.

However, the secondary cells continuously supply power to the control circuit. Accordingly, the secondary cells continue to be discharged in a low-voltage state. This may shorten the lifetime of the battery pack and needlessly reduce battery charge.

SUMMARY

In accordance with one or more embodiments, a battery pack includes a battery including at least one battery cell; a main switch connected between a first node and a second node, the battery connected to the first node and an external terminal, the external terminal connected to the second node; a controller to manage the battery and to control the main switch; and a driving voltage supply source to generate a driving voltage based on a voltage of a third node and to supply the driving voltage to the controller, wherein the third node is diode-connected to the first node and the second node.

The driving voltage supply source may includes a driving switch connected between the third node and the controller, and a driving controller to compare the voltage of the third node with a first threshold voltage and to control the driving switch based on a result of the comparison. The driving voltage supply source may include an input to provide a first signal to the driving controller, the first signal to be manually generated by an operator. The driving controller may turn on the driving switch when the driving controller receives the first signal.

The driving voltage supply source may include an auxiliary input to provide the first signal to the driving controller based on control of the controller, and the controller may control the auxiliary input to provide the first signal to the driving controller until the voltage of the third node exceeds the first threshold voltage.

When the driving controller receives the first signal, the driving controller may compare the voltage of the third node with a second threshold voltage and to control the driving switch according to a result of the comparison, and the second threshold voltage is less than the first threshold voltage.

The driving voltage supply source may includes a voltage converter connected between the driving switch and the controller, the voltage converter to convert the voltage of the third node to the driving voltage of the controller.

The battery pack may include a voltage divider connected to the third node and having a fourth node to output a division voltage; and a driving switch connected between the third node and the controller, the driving switch to turn on when the division voltage is greater than a third threshold voltage. The battery pack may include a manual switch connected between the third node and the fourth node, the manual switch to be operated by an operator; and a control switch connected in parallel to the manual switch and to be controlled by the controller. The voltage divider may include a first resistor and a second resistor connected in series between the third node and the fourth node, and the first resistor, the manual switch, and the control switch are connected in parallel.

The battery pack may include a first diode connector having an anode connected to the first node and a cathode connected to the third node; and a second diode connector having an anode connected to the second node and a cathode connected to the third node. The battery pack may include a precharge switch and a precharge resistor connected in series between the first node and the second node, wherein the controller is to control the precharge switch.

In accordance with one or more other embodiments, a control device includes a controller to control a switch; and a circuit to generate a driving voltage based on a voltage of a third node diode-connected to a first node and a second node, the controller to control the switch based on the driving voltage in order to control an operation corresponding to a battery, wherein the first node is between the switch and wherein the battery and the second node is between the switch and a terminal.

The circuit may generate the driving voltage based on a signal generated by a manual operation of a user. The may receive the signal from an input device. The input device may be a user-operated switch. The controller may change from a disabled state to an enabled state based on the signal. The controller may change from the disabled state to the enabled state based on the signal at a time when the battery is not being charged and is in a low-voltage state.

The control device may include a first diode connector between the first and third nodes, and a second diode connector between the second and third nodes. The controller may determine at least one of a voltage, temperature, or current of the battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
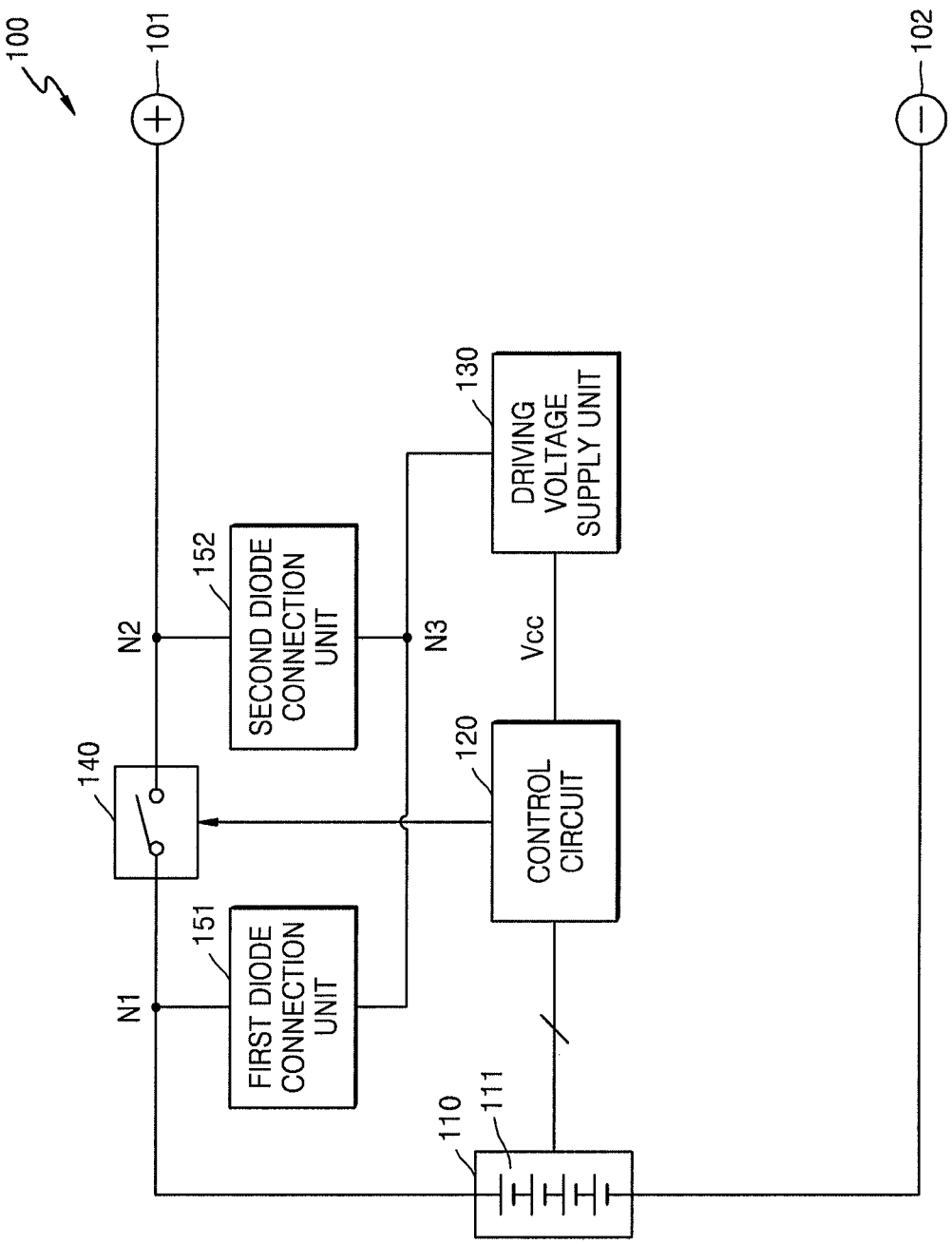
FIG. 1 illustrates an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

FIG. 1 illustrates an embodiment of a battery pack 100 which includes a battery 110, a control circuit 120, a driving voltage supply unit 130, and a main switch 140. The battery pack 100 may further include a first external terminal 101 and a second external terminal 102 to which an electrical device is connected. Examples of the electrical device include a load that operates by receiving power from the battery 110 and a charge device that charges the battery 110.

The main switch 140 is connected between a first node N1 and a second node N2. The first node is electrically connected to the battery 110, and the second node N2, is electrically connected to one of the external terminals 101 and 102, e.g., terminal 101 in FIG. 1. The control circuit 120 manages the battery 110 and controls the main switch 140. The driving voltage supply unit 130 generates a driving voltage Vcc using a voltage of a third node N3 that is diode-connected to the first node N1 and the second node N2, and supplies the generated driving voltage Vcc to the control circuit 120.

In one embodiment, the driving voltage supply unit 130 compares the voltage of the third node N3 with a first threshold voltage. When the voltage of the third node N3 is greater than the first threshold voltage, the driving voltage supply unit 130 supplies the driving voltage Vcc to the control circuit 120 to enable the control circuit 120. When the voltage of the third node N3 is less than the first threshold voltage, the driving voltage supply unit 130 may not supply the driving voltage Vcc to the control circuit 120 in order to disable the control circuit 120. The battery pack 100 operates in shutdown mode while the control circuit 120 is disabled. When the battery pack 100 is enabled while in shutdown mode, the battery pack 100 may be said to be woken up.

The battery 110 stores power and includes at least one battery cell 111. The battery 110 is illustrated in FIG. 1 as including four battery cells 111, but the battery 100 may include a different number of cells in another embodiment. The battery cells 111 may be connected in series, in parallel, or in a series/parallel combination. The number and connection method of the battery cells 111 in the battery 110 may be determined, for example, according to a required output voltage and a required power storage capacity.

Each of the battery cells 111 may be rechargeable secondary cells. For example, each battery cell 111 may be a nickel-cadmium battery cell, a nickel metal hydride battery (NiMH) cell, a lithium ion battery cell, or a lithium polymer battery cell.

The main switch 140 is controlled by the control circuit 120 and is connected between the battery 110 and one of the external terminals 101 and 102, e.g., terminal 101. The main switch 140 may be opened (e.g., turned off) or closed (turned on) according to a control signal from the control circuit 120. In one embodiment, the main switch 140 may be opened when the control circuit 120 is disabled. For example, the main switch 140 may be opened when the driving voltage Vcc is not applied to the control circuit 120. Node 1 is between the battery 110 and the main switch 140, and Node 2 is between the main switch 140 and the first external terminal 101.

When the main switch 140 is closed, the battery 110 and the first external terminal 101 are electrically connected to each other. When the electrical device is electrically connected to the battery 110 through the external terminals 101 and 102, current flows between the battery 110 and the electrical device through the main switch 140. When the main switch 140 is opened, the battery 110 and the first external terminal 101 are electrically insulated from each other. The main switch 140 may include, for example, a relay or a field effect transistor (FET).

The control circuit 120 manages the battery 110 and controls the main switch 140. The control circuit 120 detects a cell voltage, temperature, and/or current of the battery 110 and transmits a signal indicative of the detected cell voltage, temperature, and/or current to the electrical device. The control circuit 120 controls the main switch 140 according to a control command of the electrical device. For example, in the event of an abnormal state (e.g., a low-voltage, a high-voltage, an overcurrent, or a high temperature), the control circuit 120 may detect the abnormal state and open the main switch 140. In addition, the control circuit 120 may determine a state of charge (SOC) or a state of health (SOH) of the battery 110 or the battery cell 111, based on the detected cell voltage, temperature, and/or current. The control circuit 120 may perform cell balancing on the battery cells 111 of the battery 110 based on the detected cell voltages.

The battery pack 100 may include a voltage sensor, a temperature sensor, and/or a current sensor that respectively detect the cell voltage, the temperature, and/or the current of the battery 110. The control circuit 120 may be electrically connected to the voltage sensor, the temperature sensor, and the current sensor. The control circuit 120 may be, for example, a microcontroller unit or a battery management system.

When the driving voltage Vcc is applied to the control circuit 120, the control circuit 120 starts operating. The control circuit 120 may turn on the main switch 140, for example, according to a control signal received from the electrical device, or according to an algorithm stored in the control circuit 120 or a memory coupled to the control circuit 120. The driving voltage Vcc may be generated by the driving voltage supply unit 130 and provided to the control circuit 120.

The third node N3 is a node that is diode-connected to the first node N1 and the second node N2. A first diode connection unit 151 may be connected between the first node N1 and the third node N3, and a second diode connection unit 152 may be connected between the second node N2 and the third node N3. The first diode connection unit 151 may include a diode having an anode connected to the first node N1 and a cathode connected to the third node N3. The second diode connection unit 152 may include a diode having an anode connected to the second node N2 and a cathode connected to the third node N3. A voltage of the third node N3 may correspond to the greater voltage between the voltage of the first node N1 and the voltage of the second node N2. When it is assumed that threshold voltages of the first and second diode connection units 151 and 152 are very low, the voltage of the third node N3 may be substantially equal to the greater voltage between the voltage of the first node N1 and the voltage of the second node N2.

The driving voltage supply unit 130 generates the driving voltage Vcc based on the voltage of the third node N3. The driving voltage Vcc is supplied to the control circuit 120. The driving voltage supply unit 130 determines whether to supply the driving voltage Vcc to the control circuit 120 based on the voltage of the third node N3. The driving voltage supply unit 130 may generate the driving voltage Vcc of the control circuit 120 using the voltage of the third node N3.

In one embodiment, the driving voltage supply unit 130 may supply the driving voltage Vcc to the control circuit 120 only when the voltage of the third node N3 is greater than the first threshold voltage. When the voltage of the third node N3 is less than the first threshold voltage, the driving voltage supply unit 130 may not supply the driving voltage Vcc to the control circuit 120. The control circuit 120 having received no driving voltage Vcc does not start operating. As a result, the main switch 140 may maintain a turned-off state.

Since the driving voltage supply unit 130 generates the driving voltage Vcc based on the voltage of the third node N3, and not the voltage of the first node N1 or the second node N2, the driving voltage supply unit 130 may supply the driving voltage Vcc to the control circuit 120 using a battery voltage of the battery 110, even when a charging voltage is not applied through the external terminals 101 and 102. In addition, even when the battery 110, which is not being charged, is in a low-voltage state, an operator may manually supply the driving voltage Vcc to the control circuit 120 using the battery voltage of the battery 110.

Figure 2:
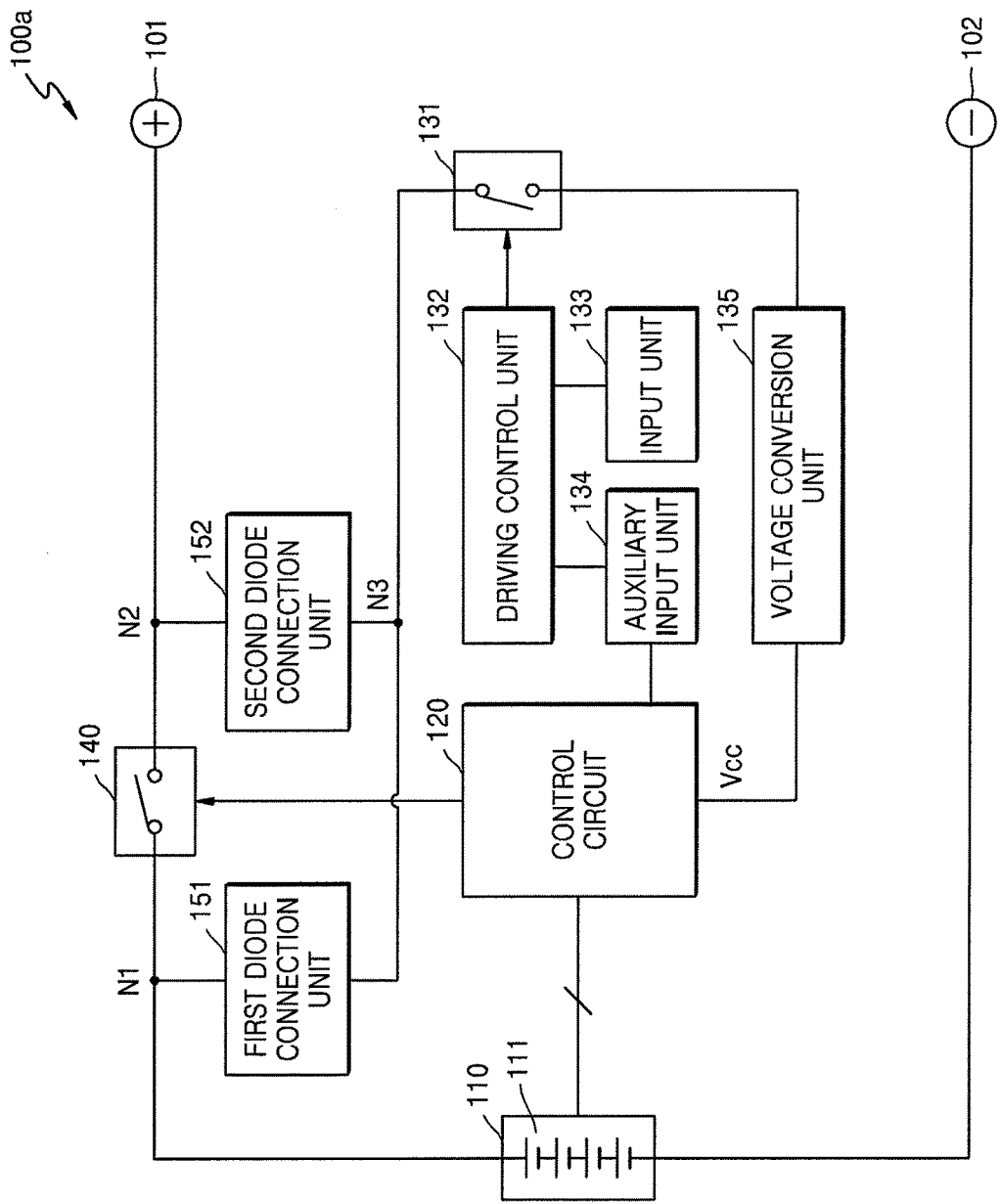
FIG. 2 illustrates another embodiment of a battery pack.

FIG. 2 illustrates another embodiment of a battery pack 100a which includes a battery 110, a control circuit 120, a main switch 140, a driving switch 131, and a driving control unit 132. The battery 110, the control circuit 120, and the main switch 140 may correspond to the battery 110, the control circuit 120, and the main switch 140 of the battery pack 100 in FIG. 1.

The driving switch 131 is connected between a third node N3 and the control circuit 120. The driving switch 131 is controlled by the driving control unit 132. When the driving switch 131 is closed, a voltage of the third node N3 is supplied to the control circuit 120, to thereby enable the control circuit 120. When the driving switch 131 is opened, the control circuit 120 is disabled to operate in shutdown mode. The driving switch 131 may include, for example, a relay or a FET.

The driving control unit 132 compares the voltage of the third node N3 with a first threshold voltage and controls the driving switch 131 based on a result of the comparison. When the voltage of the third node N3 is greater than the first threshold voltage, the driving control unit 132 closes the driving switch 131. When the voltage of the third node N3 is less than the first threshold voltage, the driving control unit 132 opens the driving switch 131. The first threshold voltage may be set to be equal to or less than a voltage corresponding to a low-voltage state of the battery cell 111.

The battery pack 100a may further include an input unit 133 that generates a first signal corresponding to an input of an operator. The first signal is output to the driving control unit 132. When the driving control unit 132 receives the first signal, the driving control unit 132 closes the driving switch 131 to forcibly enable or wake up the control circuit 120. In this case, the control circuit 120 may be driven based on power stored in the battery 110. The input unit 133 may be, for example, a push switch. The input unit 133 may generate the first signal only when an operator presses the push switch.

When the battery 110 is in a normal state or is being charged, the operator need not forcibly enable the control circuit 120 because the voltage of the third node N3 is greater than the first threshold voltage. When the battery 110 is in a low-voltage state but cannot be charged, the control circuit 120 may be enabled in order to determine the cell voltage or charging state of the battery 110.

If the battery 110 is in the low-voltage state but the control circuit 120 is continuously enabled, the control circuit 120 may continuously consume power of the battery 110. When this occurs, the battery 110 is further discharged in the low-voltage state, significantly lowering the lifetime of the battery 110.

In accordance with one embodiment, when the battery 110 is overdischarged, the driving switch 131 may be opened by the driving control unit 132. Even when the battery 110 is in the low-voltage state, it is possible to prevent the battery 110 from being continuously discharged by the control circuit 120. In addition, the operator may forcibly enable the control circuit 120 through the input unit 133 in order to determine the state of the battery 110. When the operator acquires desired information, the operator may disable the control circuit 120 again using the input unit 133. In this case, the input unit 133 may be, for example, a 2-contact push switch. In this case, the control circuit 120 may be enabled when the operator presses the push switch once and disabled when the operator presses the push switch again.

In another example embodiment, when the driving control unit 132 receives the first signal generated by the input unit 133, the driving control unit 132 may compare the voltage of the third node N3 with a second threshold voltage less than the first threshold voltage and may control the driving switch 131 based on a result of the comparison. The first threshold voltage may be set to be less than a voltage at which the battery cell 111 becomes a low-voltage state, and the second threshold voltage may be set to a voltage that greatly affects the lifetime of the battery 110 during additional discharging of the battery cell 111.

For example, when the battery 110 is in a normal state and the battery voltage is in a predetermined range (e.g., about 39 V to about 52 V in one example application), the first threshold voltage may be set to a first voltage range (e.g., between about 35 V and about 38 V) and the second threshold voltage may be set to a second voltage (e.g., between about 19 V and about 26 V). In this case, when the operator outputs the first signal through the input unit 133, the control circuit 120 may be enabled, even when the voltage of the third node N3 is less than the first threshold voltage. However, when the voltage of the third node N3 is less than the second threshold voltage, the control circuit 120 may not be enabled in order to protect the battery 110.

In another example embodiment, the battery pack 110a may include an auxiliary input unit 134 which is controlled by the control circuit 120 and which outputs the first signal to the driving control unit 132 as in the input unit 133. The control circuit 120 may control the auxiliary input unit 134 such that the first signal is output until the voltage of the third node N3 becomes greater than the first threshold voltage. When the input unit 133 is a push switch, the first signal is output only while the operator is pressing the push switch. When the operator releases the push switch, the input unit 133 may stop outputting the first signal and the control circuit 120 may be disabled again.

The auxiliary input unit 134 may continuously output the first signal to the driving control unit 132 according to the control of the control circuit 120. As a result, the control circuit 120 maintains the enabled state even when the operator releases the push switch. For example, even when the operator stops operating the input unit 133, the auxiliary input unit 134 may output the first signal under control of the control circuit 120. Thus, the control circuit 120 may maintain the enabled state.

Since the control circuit 120 is capable of detecting or calculating the voltage of the third node N3, or the voltage of the first node N1 and the voltage of the second node N2, the control circuit 120 may control the auxiliary input unit 134 to output the first signal until the driving switch 131 is in a closable state due to the voltage of the third node N3. For example, the control circuit 120 may enable the auxiliary input unit 134 to output the first signal until the voltage of the third node N3 becomes greater than the first threshold voltage.

The battery pack 110a may further include a voltage conversion unit 135. The voltage conversion unit 135 may be connected between the driving switch 131 and the control circuit 120, and may convert the voltage of the third node N3 to the driving voltage Vcc of the control circuit 120. The voltage of the third node N3 may vary with time, but the driving voltage Vcc of the control circuit 120 may be controlled to be constant. In order to achieve this, the voltage conversion unit 135 may include, for example, a DC/DC converter or a regulator that receives the voltage of the third node N3 and outputs the stable driving voltage Vcc.

Figure 3:
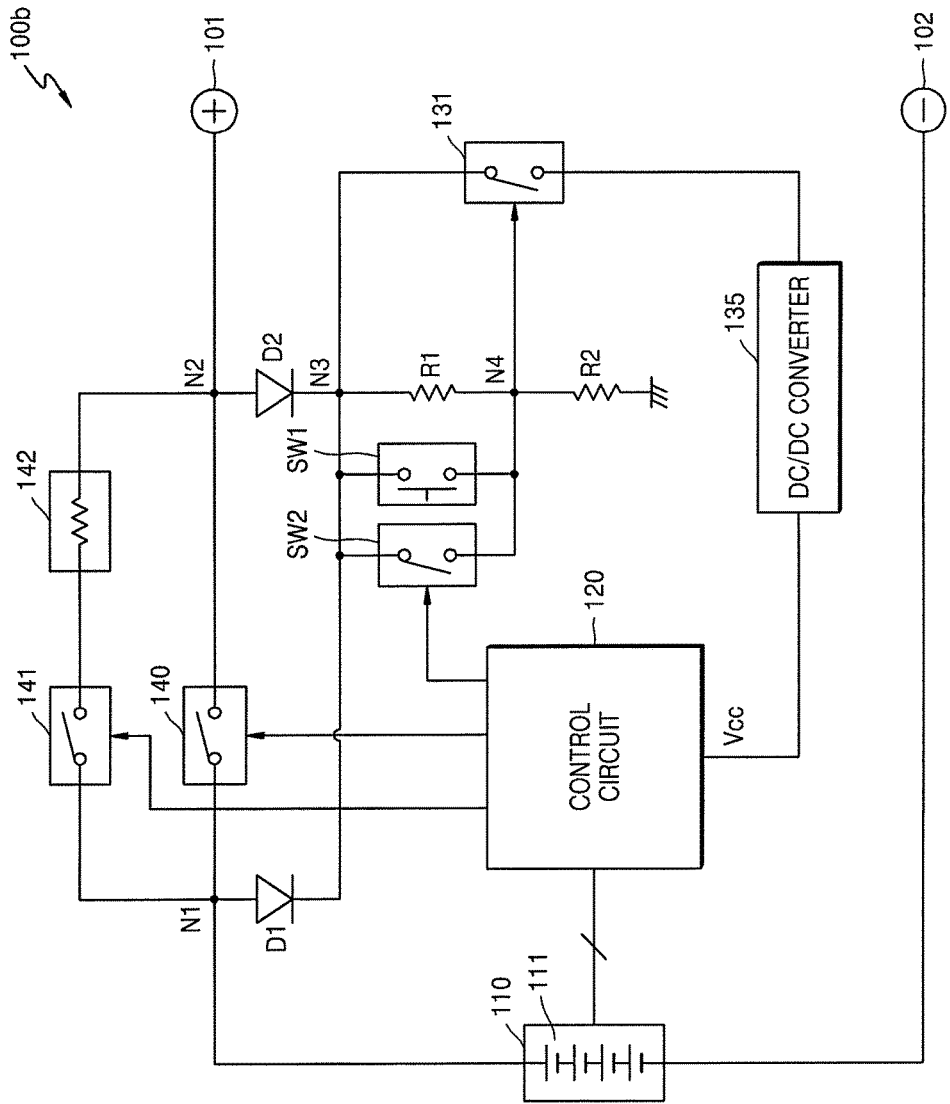
FIG. 3 illustrates another embodiment of a battery pack.

FIG. 3 illustrates another embodiment of a battery pack 100b which includes a battery 110, a control circuit 120, a main switch 140, and a driving switch 131. The battery 110, the control circuit 120, and the main switch 140 may correspond to the battery 110, control circuit 120, and main switch 140 of the battery pack 100 in FIG. 1.

The battery pack 100b may include a first diode D1 and a second diode D1. The first diode D1 is connected between a first node N1 and a third node N3, and the second diode D2 is connected between a second node N2 and the third node N3. Anodes of the first and second diodes D1 and D2 may be connected to the first node N1 and the second node N2, respectively. Cathodes of the first and second diodes D1 and D2 may be connected to the third node N3. The first and second diodes D1 and D2 may correspond, for example, to the first and second diode connection units 151 and 152 of FIG. 1.

The voltage of the node having the greater voltage between the first node N1 and the second node N2 may be applied to the third node N3, via the first diode D1 and the second diode D2. For example, when the battery 110 is being charged, the voltage of the third node N3 may correspond to the voltage of the second node N2, because the voltage of the second node N2 is greater than the voltage of the first node N1. When the battery 110 is being discharged, the voltage of the third node N3 may correspond to the voltage of the first node N1, because the voltage of the first node N1 is greater than the voltage of the second node N1.

The battery pack 100b may include a voltage division unit connected to the third node N3. The voltage division unit may include a first resistor R1 and a second resistor R2 connected to the third node N3. The first resistor R1 and the second resistor R2 may be commonly connected to an intervening fourth node N4. A voltage of the fourth node N4 may be referred to as a division voltage, and may be a voltage based on dividing the voltage of the third node N3. In one example embodiment, the division voltage of the fourth node N4 may be proportional to the voltage of the third node N3. The division voltage of the fourth node N4 may be calculated, for example, based on the product of the voltage of the third node N3 and the ratio R2/(R1+R2).

The driving switch 131 is connected between the third node N3 and the control circuit 120. The driving switch 131 may be controlled based on the division voltage of the fourth node N4. The driving switch 131 may be controlled to be closed when the division voltage of the fourth node N4 is greater than a third threshold voltage, and may be controlled to be opened when the division voltage of the fourth node N4 is less than the third threshold voltage. The third threshold voltage may correspond, for example, to the first threshold voltage described above with reference to FIGS. 1 and 2.

For example, the third threshold voltage may be set based on the product of the first threshold voltage and the ratio R2/(R1+R2). The third threshold voltage may control the driving switch 131. A ratio of the first resistor R1 to the second resistor R2 may be set based on the threshold voltage of the driving switch 131 and the first threshold voltage. For example, when the threshold voltage of the driving switch 131 is about 1.7 V and the first threshold voltage is about 35.7 V, the ratio (R1/R2) of the first resistor R1 to the second resistor R2 may be about 20 (=35.7/1.7−1). In this case, the division voltage of the fourth node N4 may be about $\frac{1}{21}$ times the voltage of the third node N3. The threshold voltage of the driving switch 131 and the first threshold voltage may be different values in another embodiment.

The battery pack 100b may further include a first switch SW1. The first switch SW1 may be a manual switch connected between the third node N3 and the fourth node N4. When the operator closes the first switch SW1, the fourth node N4 may be directly connected to the third node N3, and the voltage of the fourth node N4 may be equal to the voltage of the third node N3. For example, when the first switch SW1 is closed, the voltage of the fourth node N4 may be increased by about 21 times. Since the voltage of the third node N3 is greater than the third threshold voltage, the driving switch 131 may be closed. Therefore, the operator may enable the control circuit 120 at anytime by closing the first switch SW1. The first switch SW1 may correspond, for example, to the input unit 133 of FIG. 2.

The battery pack 100b may further include a second switch SW2. The second switch SW2 may be a control switch connected in parallel to the first switch SW1 and controlled by the control circuit 120. When the first switch SW1 is a push switch, the operator may continuously press the first switch SW1 in order to close the first switch SW1. When the operator releases the first switch SW1, the first switch SW1 is opened, the driving switch 131 is opened, and the control circuit 120 is disabled, unless the division voltage of the fourth node N4 is greater than the third threshold voltage.

Instead of the first switch SW1, a second switch SW2 may be maintained in the closed state by the control circuit 120, so that the control circuit 120 is not disabled even when the operator releases the first switch SW1. For example, even when the operator releases the first switch SW1, the fourth node N4 and the third node N3 may be directly connected to each other by the second switch SW2. The control circuit 120 may detect the voltage of the third node N3 and may open the second switch SW2 when the voltage of the third node N3 is greater than the voltage of the first threshold voltage.

In another example embodiment, the first switch SW1 may be a toggle switch that is toggled by the operator. In this case, when the voltage of the third node N3 is less than the first threshold voltage, the operator may forcibly enable or disable the control circuit 120.

The battery pack 110b may further include a voltage conversion unit 135. The voltage conversion unit 135 may be a DC/DC converter connected between the driving switch 131 and the control circuit 120. The DC/DC converter may convert the voltage of the third node N3 to the driving voltage Vcc of the control circuit 120.

The battery pack 100b may further include a precharge switch 141 and a precharge resistor 142 connected in series between the first node N1 and the second node N2. The precharge switch 141 is controlled by the control circuit 120. When a charging device is connected to external terminals 101 and 102 of the battery pack 100b while in shutdown mode and starts charging the battery pack 100b, a charging voltage is applied to the second node N2 and the voltage of the third node N3 exceeds the first threshold voltage. The driving switch 131 is closed and the voltage conversion unit 135 supplies the driving voltage Vcc to the control circuit 120.

When the control circuit 120 is enabled, the control circuit 120 detects the voltage of the first node N1 and the voltage of the second node N2, and detects that the battery pack 100b is in a chargeable state. The control circuit 120 may close the precharge switch 141.

When the precharge switch 141 is closed, charging current flows from the charging device to the battery 110. Since the precharge resistor is on a path of the charging current, no in-rush current occurs.

When the voltage of the first node N1 approaches the voltage of the second node N2, for example, by a predetermined threshold voltage or less, the control circuit 120 closes the main switch 140 and opens the precharge switch 141.

When the battery pack 100b is detected to be in the charging state, the control circuit 120 closes the second switch SW2. Then, the control circuit 120 closes the main switch 140.

When the battery pack 100b is in the charging state but the voltage of the first node N1 is less than the first threshold voltage, if the main switch is closed, the voltage of the second node N2 becomes equal to the voltage of the first node N1, even when the battery pack 100b is in the charging state. Also, the voltage of the second node N2 becomes less than the first threshold voltage. In this case, the voltage of the third node N3 also becomes less than the first threshold voltage. While this occurs, the driving switch 131 is opened and the control circuit 120 is disabled.

In one example embodiment, when the battery pack 100b is in the charging state but the voltage of the first node N1 is less than the first threshold voltage, the control circuit 120 closes the second switch SW2 to reduce a time for closing the main switch 140 after charging has started. When charging is performed through the precharge resistor 142, charging efficiency is low and it may be difficult to increase the charging current. However, when charging is performed through the main switch 140, charging efficiency may be high and the charging current may be increased. Therefore, it is possible to reduce charging time.

The control circuit 120 may detect the voltage of the first node N1 and may control the second switch SW2 based on the voltage of the first node N1. When the voltage of the first node N1 becomes greater than the first threshold voltage or the voltage of the first node N1 becomes less than the second threshold voltage, the control circuit 120 may open the second switch SW2.

Figure 4:
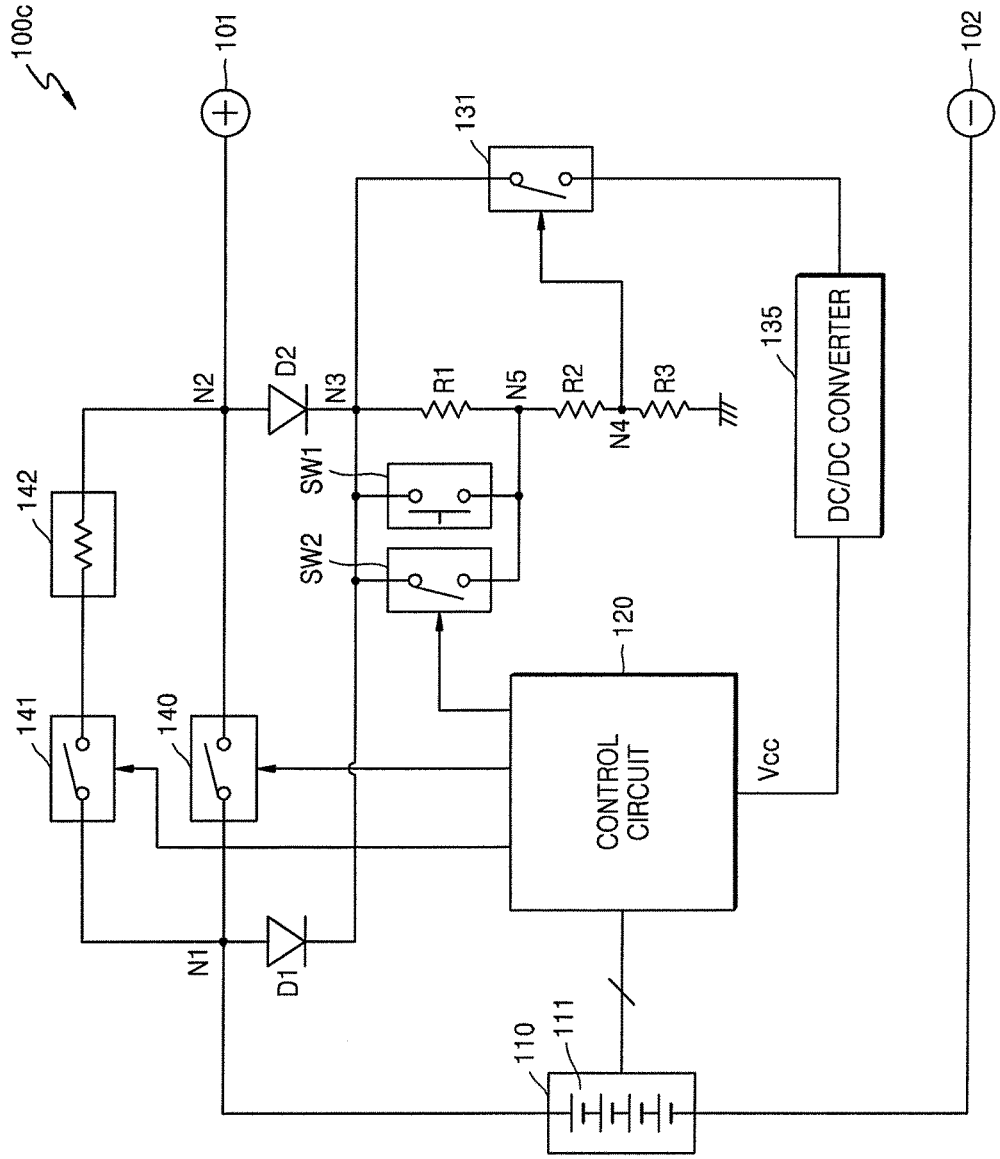
FIG. 4 illustrates another embodiment of a battery pack.

FIG. 4 illustrates another embodiment of a battery pack 100c, which may be substantially the same as the battery pack 100b except for a voltage division unit connected to a third node N3.

The battery pack 100c includes first to third resistors R1, R2, and R3 connected to the third node N3. The first to third resistors R1, R2, and R3 may constitute a voltage division unit. The first resistor R1 and the second resistor R2 may be commonly connected to an intervening fifth node N5, and the second resistor R2 and the third resistor R3 may be commonly connected to an intervening fourth node N4.

The voltage division unit may output a division voltage corresponding to the voltage of the third node N3 through the fourth node N4. The division voltage output through the fourth node N4 may be applied to a driving switch 131. The driving switch 131 may be closed when the division voltage of the fourth node N4 is greater than the third threshold voltage. The third threshold voltage may control the driving switch 131.

In one example embodiment, a first switch SW1 and a second switch SW2 of the battery pack 100c may be connected in parallel to the first resistor R1. For example, the first and second switches SW1 and SW2 may be connected between the third node N3 and the fifth node N5. The first switch SW1 may be manually operated by an operator and the second switch SW2 may be controlled by the control circuit 120.

In one embodiment, the driving switch 131 may be opened when the voltage of the third node N3 is less than the first threshold voltage. However, when the first switch SW1 or the second switch SW2 is closed, the driving switch 131 may be closed, even when the voltage of the third node N3 is less than the first threshold voltage.

On the other hand, the driving switch 131 may be opened when the voltage of the third node N3 is less than the first threshold voltage. The second threshold voltage may correspond to a voltage (e.g., a dangerous voltage) that significantly reduces the lifetime of the battery 110 when additional discharging of the battery 110 is performed. When the voltage of the third node N3 is less than the second threshold voltage, the battery 110 may be prevented from being discharged by the control circuit 120. In this case, it is possible to prevent the control circuit 120 from being enabled, even when the operator closes the first switch SW1. Therefore, it is possible to prevent the danger of full discharging that may occur in the battery 110.

When both of the first and second switches SW1 and SW2 are opened, the voltage of the fourth node N4 may correspond to the product of the voltage of the third node N3 and the ratio R3/(R1+R2+R3). When either of the first or second switches SW1 and SW2 is closed, the third node N3 and the fifth node N5 may be connected to each other, and the voltage of the fourth node N4 may correspond to the product of the voltage of the third node N3 and the ratio R3/(R2+R3).

Thus, in the previously described example, when the threshold voltage of the driving switch 131 is about 1.7 V and the first threshold voltage is about 35.7 V, a ratio ((R1+R2)/R3) of the sum of the first and second resistors R1 and R2 to the third resistor R3) may be about 20 (=35.7/1.7−1). In this case, the division voltage of the fourth node N4 may be about $\frac{1}{21}$ times the voltage of the third node N3.

When the second threshold voltage is about 22.1V, a ratio (R2/R3) of the second resistor R2 to the third resistor R3 may be about 12 (=22.1/1.7−1). Therefore, a ratio of the first resistor R1:the second resistor R2:the third resistor R3 may be set to 8:12:1. The first threshold voltage and the second threshold voltage may therefore be adjusted based on the ratio of the first resistor R1:the second resistor R2:the third resistor R3.

The control circuits of the aforementioned embodiments may be implemented in logic which, for example, may include hardware, software, or both. When implemented at least partially in hardware, the control circuit may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control circuit may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

By way of summation and review, a battery pack may include a control circuit for controlling secondary cells. The control circuit may be driven by an external power source connected to an external terminal of the battery pack. When no external power source is connected to the battery pack, the control circuit may receive power from the secondary cells. When the secondary cells are in a low-voltage state, the control circuit turns on switches between the secondary cells and the external terminal in order to protect the cells. However, the secondary cells continuously supply power to the control circuit. Accordingly, the secondary cells continue to be discharged in a low-voltage state. This may shorten the lifetime of the battery pack and needlessly reduce battery charge.

In accordance with one or more of the aforementioned embodiments, a battery pack may be manually woken up, even when the battery pack is not able to be charged because it is shutdown mode in a low-voltage state. Therefore, the battery pack may be operated stably and reliably.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Embodiments may be combined to form additional embodiments. Accordingly, it will be understood by those of skill in the art that various changes in form and details may be made without departing from the spirit and scope of the present invention as set forth in the following claims.

What is claimed is:

1. A battery pack, comprising:
a battery including at least one battery cell;
a main switch connected between a first node and a second node, the first node connected to the battery, the second node connected to an external terminal;
a first diode connector connected between the first node and a third node;
a second diode connector connected between the second node and the third node;
a controller to manage the battery and to control the main switch;
a voltage converter to convert a voltage of the third node to a driving voltage of the controller and to supply the driving voltage to the controller;
a driving switch connected between the third node and the voltage converter;
a driving control circuit to turn on the driving switch when the voltage of the third node is greater than a first threshold voltage; and
a manual switch to be manually operated by an operator and to provide a first signal to the driving control circuit when the manual switch is closed, and wherein the driving control circuit is to turn on the driving switch when the driving control circuit receives the first signal and when the voltage of the third node is greater than a second threshold voltage less than the first threshold voltage.

2. The battery pack as claimed in claim 1, further comprising:
a control switch to provide the first signal to the driving control circuit based on control of the controller, and
wherein the controller is to control the control switch to provide the first signal to the driving control circuit controller until the voltage of the third node exceeds the first threshold voltage.

3. The battery pack as claimed in claim 1, wherein:
the driving control circuit includes a voltage divider connected to the third node and having a fourth node to output a division voltage, and
the driving control circuit is to turn on the driving switch when the division voltage is greater than a third threshold voltage less than the first threshold voltage, and
the division voltage is proportional to the voltage of the third node by the voltage divider.

4. The battery pack as claimed in claim 3, further comprising:
a control switch connected in parallel to the manual switch and to be controlled by the controller, wherein the manual switch is connected between the third node and the fourth node.

5. The battery pack as claimed in claim 4, wherein:
the voltage divider includes a first resistor and a second resistor connected in series between the third node and the fourth node, and
the first resistor, the manual switch, and the control switch are connected in parallel.

6. The battery pack as claimed in claim 1, wherein:
the first diode connector having an anode connected to the first node and a cathode connected to the third node; and
the second diode connector having an anode connected to the second node and a cathode connected to the third node.

7. The battery pack as claimed in claim 1, further comprising:
a precharge switch and a precharge resistor connected in series between the first node and the second node, wherein the controller is to control the precharge switch.

8. A battery pack, comprising:
a battery including at least one battery cell;
a main switch connected between a first node and a second node, the first node connected to the battery, the second node connected to an external terminal;
a first diode connector connected between the first node and a third node;

a second diode connector connected between the second node and the third node;

a controller to manage the battery and to control the main switch;

a voltage converter to generate a driving voltage of the controller using a voltage of the third node by converting the voltage of the third node to the driving voltage and to supply the driving voltage to the controller, a voltage divider connected to the third node and having a fourth node to output a division voltage proportional to the voltage of the third node;

a driving switch connected between the third node and the voltage converter, the driving switch to turn on when the driving switch receives the division voltage greater than a third threshold voltage;

a manual switch connected between the third node and the fourth node, the manual switch to be manually operated by an operator; and a control switch connected in parallel to the manual switch and to be controlled by the controller, wherein when the manual switch is closed, the fourth node is directly connected with the third node to output the voltage of the third node as the division voltage to the driving switch.

9. A battery pack, comprising:

a battery including at least one battery cell;

a main switch connected between a first node and a second node, the first node connected to the battery, the second node connected to an external terminal;

a first diode connector connected between the first node and a third node;

a second diode connector connected between the second node and the third node;

a controller to manage the battery and to control the main switch;

a voltage converter to convert a voltage of the third node to a driving voltage of the controller and to supply the driving voltage to the controller, a voltage divider having a fourth node to output a division voltage and including a first resistor between the third node and a fifth node and a second resistor between the fifth node and the fourth node;

a driving switch connected between the third node and the voltage converter, the driving switch to turn on when the driving switch receives the division voltage greater than a third threshold voltage;

a manual switch connected in parallel to the first resistor, the manual switch to be manually operated by an operator; and a control switch connected in parallel to the first resistor and to be controlled by the controller, and wherein when the manual switch and the control switch are opened, the driving switch receives the division voltage proportional to the voltage of the third node by a first ratio, and wherein when the manual switch or the control switch is closed, the fifth node are directly connected with the third node and the driving switch receives the division voltage proportional to the voltage of the third node by a second ratio greater than the first ratio.

* * * * *